United States Patent
Schuster et al.

(10) Patent No.: US 9,542,947 B2
(45) Date of Patent: Jan. 10, 2017

(54) METHOD AND APPARATUS INCLUDING PARALLELL PROCESSES FOR VOICE RECOGNITION

(71) Applicant: Google Technology Holdings LLC, Mountain View, CA (US)

(72) Inventors: Adrian M Schuster, West Olive, MI (US); Joel A Clark, Woodridge, IL (US); Giles T Davis, Mundelein, IL (US); Plamen A Ivanov, Schaumburg, IL (US); Robert A Zurek, Antioch, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 245 days.

(21) Appl. No.: 13/955,719

(22) Filed: Jul. 31, 2013

(65) Prior Publication Data

US 2014/0278416 A1 Sep. 18, 2014

Related U.S. Application Data

(60) Provisional application No. 61/827,078, filed on May 24, 2013, provisional application No. 61/776,793, (Continued)

(51) Int. Cl.
*G10L 15/32* (2013.01)
*G10L 17/00* (2013.01)

(52) U.S. Cl.
CPC .............. *G10L 17/00* (2013.01); *G10L 15/32* (2013.01)

(58) Field of Classification Search
CPC ..................................................... G10L 15/32
(Continued)

(56) References Cited

U.S. PATENT DOCUMENTS 4,991,217 A * 2/1991 Garrett ...................... G06F 3/16
704/235
6,219,645 B1 * 4/2001 Byers ...................... G10L 15/02
381/91

(Continued)

FOREIGN PATENT DOCUMENTS

EP 0736211 3/2004
EP 1796080 B1 11/2009

(Continued)

OTHER PUBLICATIONS

Everitt et al., "Disambiguating Speech Commands Using Physical Context," ICMI '07, Proceedings of the 9th International Conference on Multimodal Interfaces, 2007, 8 pages.

(Continued)

*Primary Examiner* — David Hudspeth
*Assistant Examiner* — Oluwadamilola M Ogunbiyi
(74) *Attorney, Agent, or Firm* — Fish & Richardson P.C.

(57) ABSTRACT

A method and apparatus for voice recognition performed in a voice recognition block comprising a plurality of voice recognition stages. The method includes receiving a first plurality of voice inputs, corresponding to a first phrase, into a first voice recognition stage of the plurality of voice recognition stages, wherein multiple ones of the voice recognition stages includes a plurality of voice recognition modules and multiples ones of the voice recognition stages perform a different type of voice recognition processing, wherein the first voice recognition stage processes the first plurality of voice inputs to generate a first plurality of outputs for receipt by a subsequent voice recognition stage. The method further includes, receiving by each subsequent voice recognition stage a plurality of outputs from a preceding voice recognition stage, wherein a plurality of final (Continued)

outputs is generated by a final voice recognition stage from which to approximate the first phrase.

15 Claims, 7 Drawing Sheets

Related U.S. Application Data filed on Mar. 12, 2013, provisional application No. 61/798,097, filed on Mar. 15, 2013.

(58) Field of Classification Search
USPC .................................... 704/E15.049, E15.05
See application file for complete search history.

(56) References Cited

U.S. PATENT DOCUMENTS

| | | | |
|---|---|---|---|
| 6,446,076 B1 | 9/2002 | Burkey et al. | |
| 6,526,380 B1* | 2/2003 | Thelen et al. | 704/251 |
| 7,203,651 B2 | 4/2007 | Baruch et al. | |
| 7,720,682 B2 | 5/2010 | Stephanick et al. | |
| 7,769,142 B2 | 8/2010 | Selbie et al. | |
| 7,877,255 B2* | 1/2011 | Zlokarnik | 704/252 |
| 7,881,936 B2 | 2/2011 | Longe et al. | |
| 8,204,746 B2 | 6/2012 | Odinak | |
| 8,346,549 B2 | 1/2013 | Ljolje et al. | |
| 8,949,130 B2* | 2/2015 | Phillips | 704/270 |
| 2003/0086341 A1* | 5/2003 | Wells et al. | 369/13.56 |
| 2003/0236664 A1* | 12/2003 | Sharma | 704/251 |
| 2004/0019488 A1 | 1/2004 | Portillo | |
| 2004/0043758 A1 | 3/2004 | Sorvari et al. | |
| 2005/0017954 A1 | 1/2005 | Kay et al. | |
| 2005/0049864 A1* | 3/2005 | Kaltenmeier et al. | 704/233 |
| 2005/0175169 A1 | 8/2005 | Boda | |
| 2005/0246325 A1 | 11/2005 | Pettinati et al. | |
| 2006/0009980 A1 | 1/2006 | Burke et al. | |
| 2006/0069564 A1 | 3/2006 | Allison et al. | |
| 2007/0185714 A1* | 8/2007 | Kim | G10L 15/08 704/254 |
| 2007/0208555 A1 | 9/2007 | Blass et al. | |
| 2008/0189106 A1* | 8/2008 | Low | G01C 21/3608 704/231 |
| 2008/0270135 A1 | 10/2008 | Goel et al. | |
| 2009/0030697 A1 | 1/2009 | Cerra et al. | |
| 2009/0326937 A1 | 12/2009 | Chitsaz et al. | |
| 2010/0191520 A1 | 7/2010 | Gruhn et al. | |
| 2010/0191530 A1 | 7/2010 | Nakano et al. | |
| 2011/0015928 A1 | 1/2011 | Odell et al. | |
| 2011/0054894 A1 | 3/2011 | Phillips et al. | |
| 2011/0054896 A1 | 3/2011 | Phillips et al. | |
| 2011/0054900 A1 | 3/2011 | Phillips et al. | |
| 2011/0066634 A1 | 3/2011 | Phillips et al. | |
| 2011/0143731 A1 | 6/2011 | Ramer et al. | |
| 2012/0179457 A1 | 7/2012 | Newman et al. | |
| 2012/0179469 A1 | 7/2012 | Newman et al. | |
| 2012/0215539 A1 | 8/2012 | Juneja | |
| 2012/0271631 A1 | 10/2012 | Weng et al. | |
| 2012/0330652 A1* | 12/2012 | Turnbull | G10L 21/02 704/226 |
| 2013/0080171 A1 | 3/2013 | Mozer et al. | |
| 2014/0129218 A1* | 5/2014 | Liu | G10L 15/32 704/231 |

FOREIGN PATENT DOCUMENTS

| | | | |
|---|---|---|---|
| WO | WO 02061726 A1 * | 8/2002 | |
| WO | 2010003109 A2 | 1/2010 | |

OTHER PUBLICATIONS

Hakkani-Tur, Dilek et al., "Unsupervised and Active Learning in Automatic Speech Recognition for Call Classification," Proceedings (ICAASP '04) IEEE International Conferences on Acoustics, Speech, and Signal Processing, 2004, 4 pages.

International Search Report and Written Opinion in International Application No. PCT/US2013/047780, mailed Aug. 23, 2013, 10 pages.

International Search Report and Written Opinion in International Application No. PCT/US2014/034686, mailed Jul. 10, 2014, 10 pages.

Brand, "Coupled Hidden Markov Models for modeling interacting Processes," Learning and Common Sense Technical Report 405, Jun. 3, 1997, pp. 1-28.

Chu and Huang, "Bimodal Speech Recognition Using Coupled Hidden Markov Models," The Proceedings of the 6th International Conference on Spoken Language Processing (vol. 2), Oct. 16, 2000, abstract only, 4 pages.

International Preliminary Report on Patentability in International Application No. PCT/US2014/013976, mailed Sep. 24, 2015, 7 pages.

International Search Report and Written Opinion in International Application No. PCT/US2014/013976, mailed Apr. 22, 2014, 7 pages.

* cited by examiner

METHOD AND APPARATUS INCLUDING PARALLELL PROCESSES FOR VOICE RECOGNITION

RELATED APPLICATIONS

The present application is related to and claims benefit under 35 U.S.C. §119(e) of U.S. Provisional Patent Application No. 61/776,793, filed Mar. 12, 2013, titled "VOICE RECOGNITION FOR A MOBILE DEVICE", U.S. Provisional Patent Application No. 61/798,097, filed Mar. 15, 2013, titled "VOICE RECOGNITION FOR A MOBILE DEVICE"; and U.S. Provisional Patent Application No. 61/827,078, filed May 24, 2013, titled "METHOD AND APPARATUS INCLUDING PARALLEL PROCESSES FOR VOICE RECOGNITION", which are commonly owned with this application by Motorola Mobility LLC, and the entire contents of each are incorporated herein by reference.

FIELD OF THE DISCLOSURE

The present disclosure relates to electronic devices such as mobile devices and, more particularly, to methods and systems for performing voice recognition at or in relation to such electronic devices

BACKGROUND

Mobile devices such as cell phones, personal digital assistants (PDAs), and smart phones, as well as a variety of other electronic devices, increasingly include voice recognition capabilities. Through their ability to recognize incoming voice signals from users (or others), such mobile devices or other electronic devices are able to achieve high levels of interactivity with the users (or others) and to provide numerous valuable functions that depend upon voice input.

Although technologies for performing voice recognition have been improving, accurate voice recognition remains a technical challenge. Although a variety of voice recognition technologies have been developed including, for example, acoustic matching and speech-to-text voice recognition, existing voice recognition technologies nevertheless each have their own strengths and weaknesses.

Therefore, although any given mobile device or other electronic device will typically be designed to utilize a particular type of voice recognition technology deemed to be suitable for the mobile device or other electronic device (or the particular applications on or performance goals for such mobile device or other electronic device) on which it is being implemented, nevertheless the implementation of the voice recognition technology on the mobile device or other electronic device will be limited in certain respects.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed embodiments, and explain various principles and advantages of those embodiments.

Figure 1:
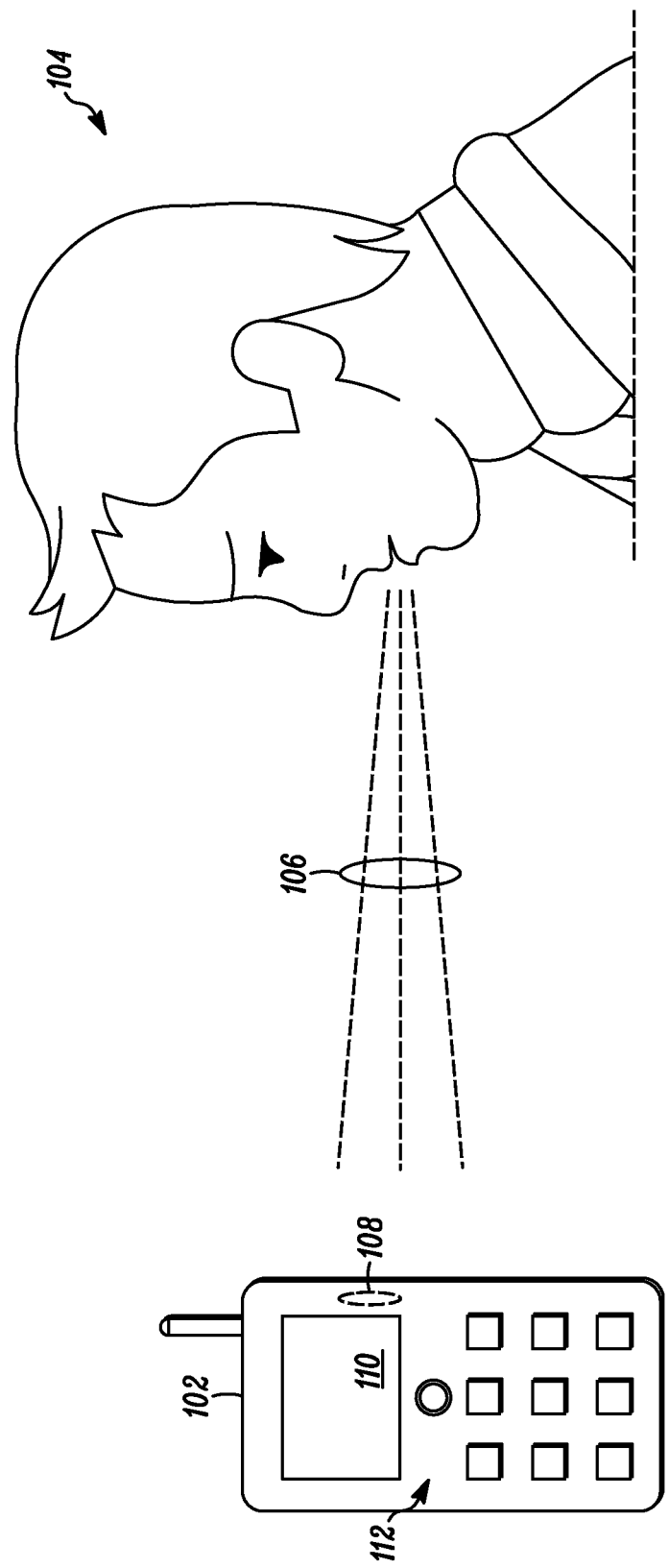
FIG. 1 is a schematic diagram of an example electronic device that, in the present example, is a mobile device, on which may be implemented methods or systems for voice recognition (or which itself may constitute such as a system) in accordance with embodiments disclosed herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of disclosed embodiments. In addition, the description and drawings do not necessarily require the order illustrated. It will be further appreciated that certain actions and/or steps may be described or depicted in a particular order of occurrence while those skilled in the art will understand that such specificity with respect to sequence is not actually required.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Generally speaking, pursuant to the various embodiments, the present disclosure provides a method and apparatus for voice recognition processing performed in a mobile device. In one embodiment, the system and method support performing voice recognition processing on a plurality of acoustic input devices using a plurality of different apparatuses and operations which are separated into a number of stages where each stage includes a number of modules. The acoustic input devices are separated into a number of different paths which, in one example, are processed in parallel and which result in a number of final outputs. Each final output reflects performing different types of voice recognition processing in a different manner on different inputs. Thus, when the multiple modules of the multiple voice recognition stages execute in parallel, a greater coverage of potential usage conditions and variables is achieved when compared to executing through a single process or a single thread of processes. One or more of the final outputs are selected as most closely approximating a spoken phrase.

Therefore, provided in one embodiment is a method for voice recognition performed in a voice recognition block including a plurality of voice recognition stages. The method includes receiving a first plurality of voice inputs, corresponding to a first phrase, into a first voice recognition stage of the plurality of voice recognition stages, wherein multiple ones of the voice recognition stages include a plurality of voice recognition modules and multiples ones of the voice recognition stages perform a different type of voice recognition processing. Further, the first voice recognition stage processes the first plurality of voice inputs to generate a first plurality of outputs for receipt by a subsequent voice recognition stage of the plurality of voice recognition stages. Each subsequent voice recognition stage receives a plurality of outputs from an immediately preceding voice recognition stage, wherein each subsequent voice recognition stage processes a plurality of outputs from the immediately preceding voice recognition stage to generate a plurality of corresponding subsequent outputs. A plurality of final outputs each containing a corresponding phrase is generated by a final voice recognition stage from which to approximate the first phrase corresponding to the first plurality of voice inputs.

Also provided is a system for performing voice recognition. In one embodiment the system includes a first voice recognition stage configured to receive a first plurality of voice channels corresponding to a first phrase and configured with at least one voice recognition module to process the first plurality of voice channels and generate a first plurality of outputs. The system, in one example, also includes a set of subsequent voice recognition stages each configured with at least one voice recognition module to process a plurality of outputs from the immediately preceding voice recognition stage and to generate a plurality of corresponding subsequent outputs, a final voice recognition stage of the set of subsequent voice recognition stages that is configured to generate a plurality of final outputs, wherein multiple ones of the voice recognition stages include a plurality of voice recognition modules and multiples ones of the voice recognition stages are configured to perform a different type of voice recognition processing. Further, one embodiment also includes a selector module configured to select at least one of the final outputs to approximate the first phrase corresponding to the first plurality of voice channels.

Referring to the drawings, and in particular to FIG. 1, an example mobile device 102 is illustrated on which may be implemented methods or constitute a system for voice recognition in accordance with embodiments disclosed herein. The mobile device 102 communicates with a user 104. More particularly, as shown, the user 104 provides voice input (or vocalized information or speech) 106 that is detected by the mobile device 102 by way of a microphone (or other acoustic input device) 108. Further as shown, in the present embodiment the mobile device 102 includes a touch screen display 110 that is both able to display visual images and also able to receive or sense touch type inputs as provided by way of a user's finger or other touch input device such as a stylus.

Notwithstanding the presence of the touch screen display 110, in the present embodiment the mobile device 102 also has a number of discrete keys or buttons 112 that serve as input devices of the mobile device 102. However, in other embodiments such keys or buttons (or any particular number of such keys or buttons) need not be present, and rather the touch screen display 110 serves as the primary or only user input device. Although FIG. 1 particularly shows the mobile device 102 as including the touch screen display 110 and keys or buttons 112, these features are only intended to be examples of components/features on a mobile device, and in other embodiments the mobile device 102 need not include one or more of these features and/or may include other features in addition to or instead of these features.

The mobile device 102 is intended to be representative of a variety of mobile devices including, for example, cellular telephones, personal digital assistants (PDAs), smart phones, or other handheld or portable electronic devices. In alternate embodiments, the mobile device is a headset (e.g., a Bluetooth headset), MP3 player, battery-powered device, a watch device (e.g., a wristwatch) or other wearable device, radio, navigation device, laptop or notebook computer, netbook, pager, PMP (personal media player), DVR (digital video recorders), gaming device, camera, e-reader, e-book, tablet device, navigation device with video capable screen, multimedia docking station, or other mobile device.

Additionally, although FIG. 1 particularly shows the mobile device 102, the mobile device is intended to be representative not only of mobile devices but also of other electronic devices. Indeed, embodiments of the present disclosure are intended to be applicable to any of a variety of electronic devices that are capable of or configured to receive voice input or other sound inputs that are indicative or representative of vocalized information. Moreover, embodiments of the present disclosure are intended to be applicable to any of a variety of electronic devices that are capable of or configured to perform voice recognition processes on the received voice input or other sound input.

Figure 2:
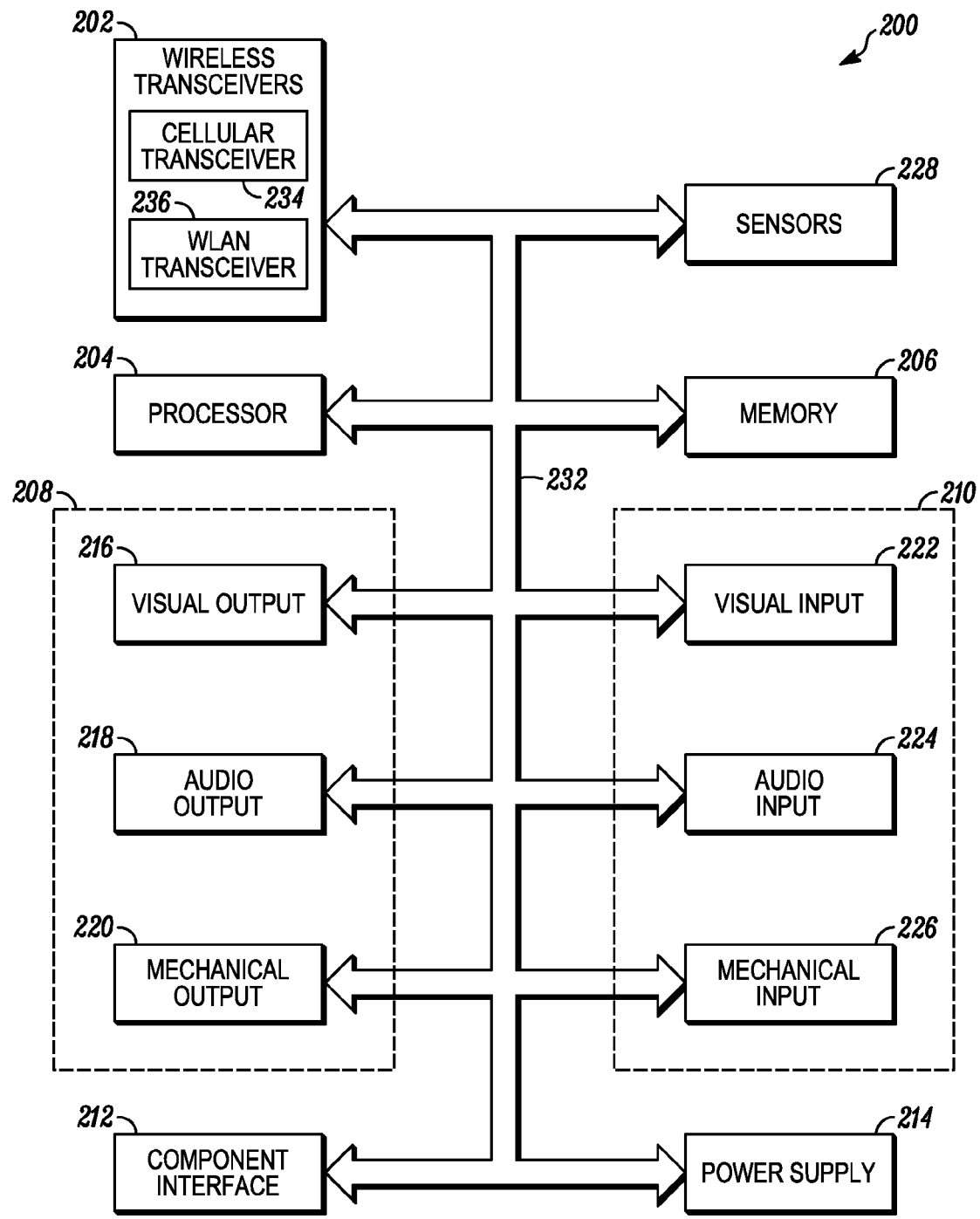
FIG. 2 is a block diagram showing example components of the mobile device of FIG. 1.

Referring to FIG. 2, there is provided a block diagram illustrating example internal components 200 of the mobile device 102 of FIG. 1, in accordance with the present embodiment. As shown in FIG. 2, the internal components 200 include one or more wireless transceivers 202, one or more processors 204 (e.g., a microprocessor, microcomputer, application-specific integrated circuit, digital signal processor (DSP) etc.), a memory portion 206, one or more output devices 208, and one or more input devices 210. In the embodiment shown, the internal components 200 further include a component interface 212 to provide a direct connection to auxiliary components or accessories for additional or enhanced functionality.

In this embodiment, the internal components 200 also include a power supply 214, such as a battery, for providing power to the other internal components while enabling the mobile device 102 to be portable. Further, the internal components 200 additionally include one or more sensors 228. As further illustrated, the internal components 200 are coupled to one another, and in communication with one another, by way of one or more internal communication links 232 (e.g., an internal bus).

Further, in the present embodiment of FIG. 2, the wireless transceivers 202 particularly include a cellular transceiver 234 and a Wireless Fidelity (Wi-Fi) transceiver 236. More particularly, the cellular transceiver 234 is configured to conduct cellular communications, such as Third Generation (3G), Fourth Generation (4G), 4G Long Term Evolution (LTE), vis-à-vis cell towers (not shown). In other embodiments, the cellular transceiver 234 is configured to utilize any of a variety of other cellular-based communication technologies such as analog communications (using Advanced Mobile Phone System—AMPS), digital communications (using Code Division Multiple Access—CDMA, Time Division Multiple Access—TDMA, Global System for Mobile communication—GSM, integrated Digital Enhanced Network—iDEN, General Packet Radio Service—GPRS, Enhanced Data for GSM Evolution—EDGE, etc.), and/or next generation communications (using Universal Mobile Telecommunication System—UMTS, Wideband CDMA—WCDMA, LTE, Institute of Electrical and Electronics Engineers—IEEE 802.16, etc.) or variants thereof.

By contrast, the Wi-Fi transceiver 236 is a wireless local area network (WLAN) transceiver 236 configured to conduct Wi-Fi communications in accordance with the IEEE 802.11 (a, b, g, or n) standard with access points. In other embodiments, the Wi-Fi transceiver 236 instead (or in addition) conducts other types of communications commonly understood as being encompassed within Wi-Fi communications such as some types of peer-to-peer (e.g., Wi-Fi Peer-to-Peer) communications. Further, in other embodiments, the Wi-Fi transceiver 236 is replaced or supplemented with one or more other wireless transceivers configured for non-cellular wireless communications including, for example, wireless transceivers employing ad hoc communication technologies such as HomeRF (radio frequency), Home Node B (3G femtocell), Bluetooth and/or other wireless communication technologies such as infrared technology.

Although in the present embodiment the mobile device 102 has two of the wireless transceivers 202 (that is, the transceivers 234 and 236), the present disclosure is intended to encompass numerous embodiments in which any number of wireless transceivers employing any number of communication technologies are present. Moreover, additional types of transceivers can be included in the wireless transceivers 202. In one example implementation, the wireless transceivers 202 include one or more transceivers used to determine the location of the device 102, such as a Global Positioning System (GPS) transceiver (not shown) and/or a triangulation receiver, which may or may not be implemented by the cellular transceiver 234. By using the wireless transceivers 202, the mobile device 102 can communicate with any of a variety of other devices or systems (not shown) including, for example, other mobile devices, web servers, cell towers, access points, other remote devices, etc. Depending upon the embodiment or circumstance, wireless communication between the mobile device 102 and any number of other devices or systems may be achieved.

Operation of the wireless transceivers 202 in conjunction with others of the internal components 200 of the mobile device 102 may take a variety of forms. For example, operation of the wireless transceivers 202 may proceed in a manner in which, upon reception of wireless signals, the internal components 200 detect communication signals and the transceivers 202 demodulate the communication signals to recover incoming information, such as voice and/or data, transmitted by the wireless signals. After receiving the incoming information from the transceivers 202, the processor 204 formats the incoming information for the one or more output devices 208. Likewise, for transmission of wireless signals, the processor 204 formats outgoing information, which may but need not be activated by the input devices 210, and conveys the outgoing information to one or more of the wireless transceivers 202 for modulation so as to provide modulated communication signals to be transmitted.

Depending upon the embodiment, the input and output devices 208, 210 of the internal components 200 include a variety of visual, audio and/or mechanical inputs. For example, the output device(s) 208 include one or more visual output devices 216 such as the display 110 of FIG. 1, a liquid crystal display and/or light emitting diode indicator, one or more audio output devices 218 such as a speaker, alarm, and/or buzzer, and/or one or more mechanical output devices 220 such as a vibrating mechanism. The visual output devices 216 among other things also include a video screen.

Likewise, by example, the input device(s) 210 include one or more visual input devices 222 such as the touch sensitive display 110 of FIG. 1, an optical sensor (for example, a camera lens and photosensor), one or more acoustic or audio input devices 224 such as the microphone 108 of FIG. 1 (or further, for example, one or more other microphones as in a directional microphone and beam former arrangement or a microphone of a Bluetooth headset), and/or one or more mechanical input devices 226 such as a flip sensor, keyboard, keypad (e.g., 112 of FIG. 1), selection button, navigation cluster, touch pad, capacitive sensor, motion sensor, display 110, and/or switch. Operations that actuate one or more of the input devices 210 include not only the physical pressing/actuation of buttons or other actuators, but also include, for example, opening the mobile device, unlocking the device, moving the device to actuate a motion, moving the device to actuate a location positioning system, and operating the device.

As mentioned above, this embodiment of internal components 200 also includes one or more of various types of sensors 228 as well as a sensor hub to manage one or more functions of the sensors. The sensors 228 include, for example, proximity sensors (e.g., a light detecting sensor, an ultrasound transceiver or an infrared transceiver), touch sensors, altitude sensors, and one or more location circuits/components that includes, for example, an accelerometer, a tilt sensor, a gyroscope, or any other information collecting device that identifies a current location or user-device interface (carry mode) of the mobile device 102.

Although the sensors 228 for the purposes of FIG. 2 are considered to be distinct from the input devices 210, in other embodiments it is possible that one or more of the input devices constitutes one or more of the sensors (and vice-versa). Additionally, although in the present embodiment the input devices 210 are shown to be distinct from the output devices 208, it should be recognized that in some embodiments one or more devices serve both as input device(s) and output device(s). In particular, in the present embodiment in which the mobile device 102 includes the touch screen display 110, the touch screen display constitutes both a visual output device and a mechanical input device (by contrast, the keys or buttons 112 are merely mechanical input devices).

The memory portion 206 of the internal components 200 encompasses, in some embodiments, one or more memory devices of any of a variety of forms (e.g., read-only memory, random access memory, static random access memory, dynamic random access memory, etc.), and the processor 204 uses the memory device(s) to store and retrieve data. In some embodiments, the memory portion 206 is integrated with the processor 204 in a single device (e.g., a processing device including memory or processor-in-memory (PIM)), albeit such a single device still typically has distinct portions/sections that perform the different processing and memory functions and that are considered, in one example, separate devices. In some alternate embodiments, the memory portion 206 of the mobile device 102 is supplemented or replaced by other memory portion(s) located elsewhere apart from the mobile device and, in such embodiments, the mobile device is in communication with or access such other memory device(s) by way of any of various communications techniques, for example, wireless communications afforded by the wireless transceivers 202, or connections via the component interface 212.

The data that is stored by the memory portion 206 includes, but need not be limited to, operating systems, programs (applications), algorithms, and informational data.

Each operating system includes executable code that controls basic functions of the mobile device 102, such as interaction among the various components included among the internal components 200, communication with external devices via the wireless transceivers 202 and/or the component interface 212, and storage and retrieval of programs and data, to and from the memory portion 206. As for programs, each program includes executable code that utilizes an operating system to provide more specific functionality, such as file system service and handling of protected and unprotected data stored in the memory portion 206. Such programs include, among other things, programming for enabling the mobile device 102 to perform a process such as the process for voice recognition shown in FIG. 6 and FIG. 7 and discussed further below. Finally, with respect to informational data, this is non-executable code or information that an operating system or program references and/or manipulates, in one embodiment, for performing functions of the mobile device 102.

Figure 3:
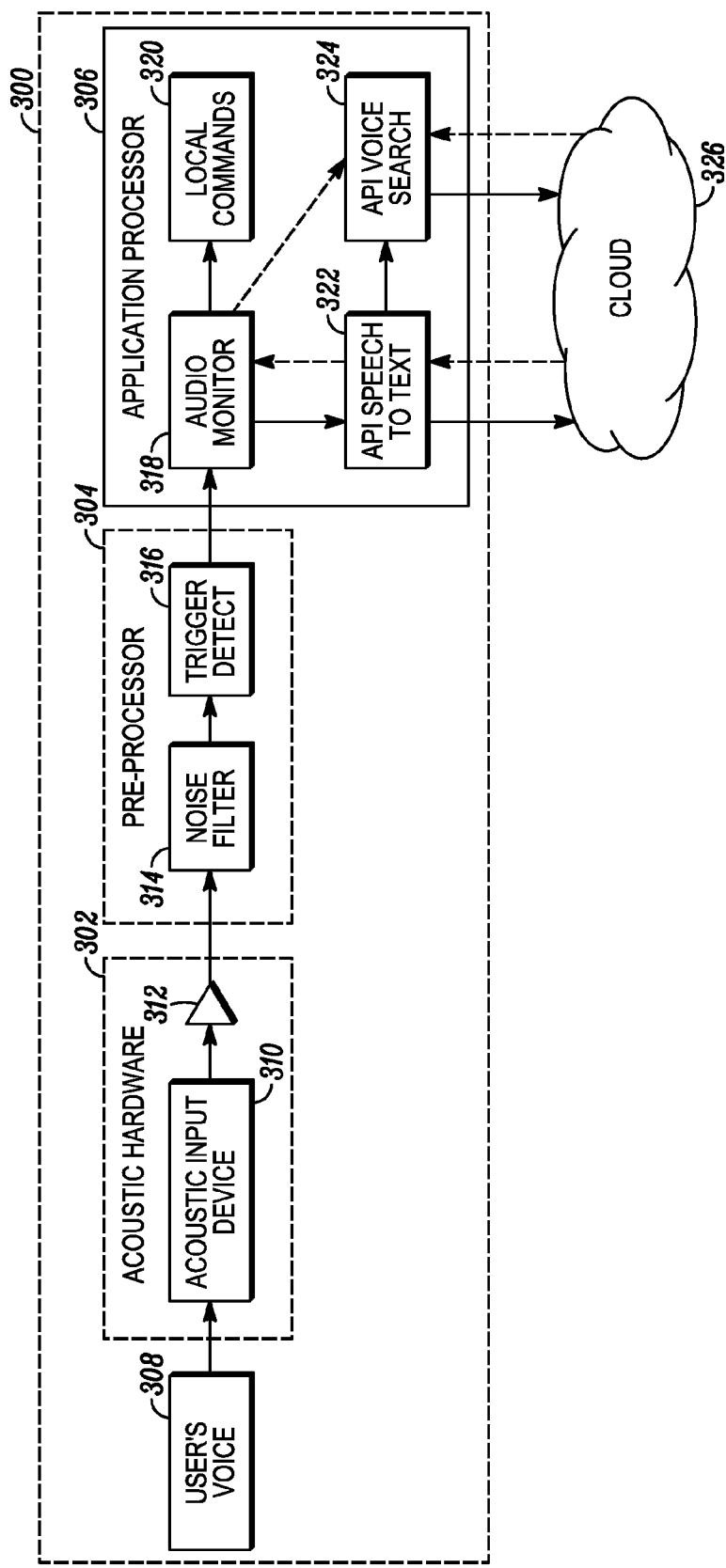
FIG. 3 is a block diagram showing example components on which may be implemented methods or constitute a system for voice recognition in accordance with embodiments disclosed herein.

Referring to FIG. 3, there is shown example components on which may be implemented methods or constitute a system 300 for voice recognition in accordance with embodiments disclosed herein. The voice recognition system 300 as illustrated includes acoustic hardware 302 and an application processor 306. The acoustic hardware 302 includes an acoustic input component 310 and an amplifier 312. The application processor 306 includes an audio monitor component 318, a component 320 that processes local commands, a speech to text application programming interface (API) 322, and a voice search API 324. In some embodiments, although not required, the voice recognition system 300 also includes a pre-processor 304 having a noise filter 314 and a trigger detect component 316. In a particular embodiment, the acoustic hardware 302 is included within the audio input components 224 (FIG. 2) of an electronic device such as the device 102 illustrated in FIG. 1. Moreover, the pre-processor 304 and the application processor 306 are included as part of the processor(s) 204 of the device 102 in one example arrangement.

The acoustic input component 310 is capable of and configured for receiving voice inputs 308 from an environment of the device (such as a user's speech input). The amplifier 312 amplifies a resultant signal provided at the output of the acoustic input component 310. In an embodiment, the acoustic input component 310 includes one or more microphones and a corresponding transducer(s).

Where the device includes the pre-processor 304, the noise filter 314 receives the amplified signal from the acoustic hardware 302 and removes some or all noise from the amplified signal. The trigger detect 316 of the pre-processor 302 receives the filtered signal from the noise filter 314 and analyzes the filtered signal for one or more "trigger" signals. A "trigger" signal includes, but is not limited to, signals based on predetermined sounds, words, phrases, and the like. Where a trigger signal is present, the application processor proceeds to perform further voice recognition processing on the signal from the pre-processor 304.

More specifically, after the trigger detect 316 detects a trigger signal, the pre-processor 304 awakens the application processor 306 to an active state or mode if the application processor 306 is in a sleep mode. Alternatively the application processor 306 is already active when the trigger detect 316 detects the "trigger". While active, the audio monitor 318 of the application processor 306 receives the incoming signal from the pre-processor 304 and determines how to further process the incoming signal based on the characteristics of the signal and/or context associated with the incoming signal.

For example, the audio monitor 318 may forward part or all of the incoming signal to the local commands component 320 of the application processor 306 in order to process and interpret the information locally at the device. For example, the local commands component 320 is configured to command the device to perform certain functions, including but not limited to initiate a call, start an application, dictate a "document" such as an email or text message or other writing, etc.

For another example, the audio monitor 318 forwards part or all of the incoming signal to a component remote from, or external to, the device, such as a component (e.g., a server) within a cloud 326. In one implementation, the cloud represents a networking system such as the Internet, a wireless local area network, etc. In this example arrangement, the application processor 306 communicates with the remote or external component via the APIs 322 and/or 324 to provide or ensure the proper communication protocol between the components.

For one embodiment, the speech-to-text API 322 communicates textual information, converted from speech information, to the cloud 326 to perform a text-based search of the information. For another embodiment, the voice search API 324 communicates audio information to the cloud 326 to perform a non-text based search of the information. It is to be understood that reference to a particular component is not restricted to a single component and may also be a group of components providing the same or similar functions, such as a chipset.

Figure 4:
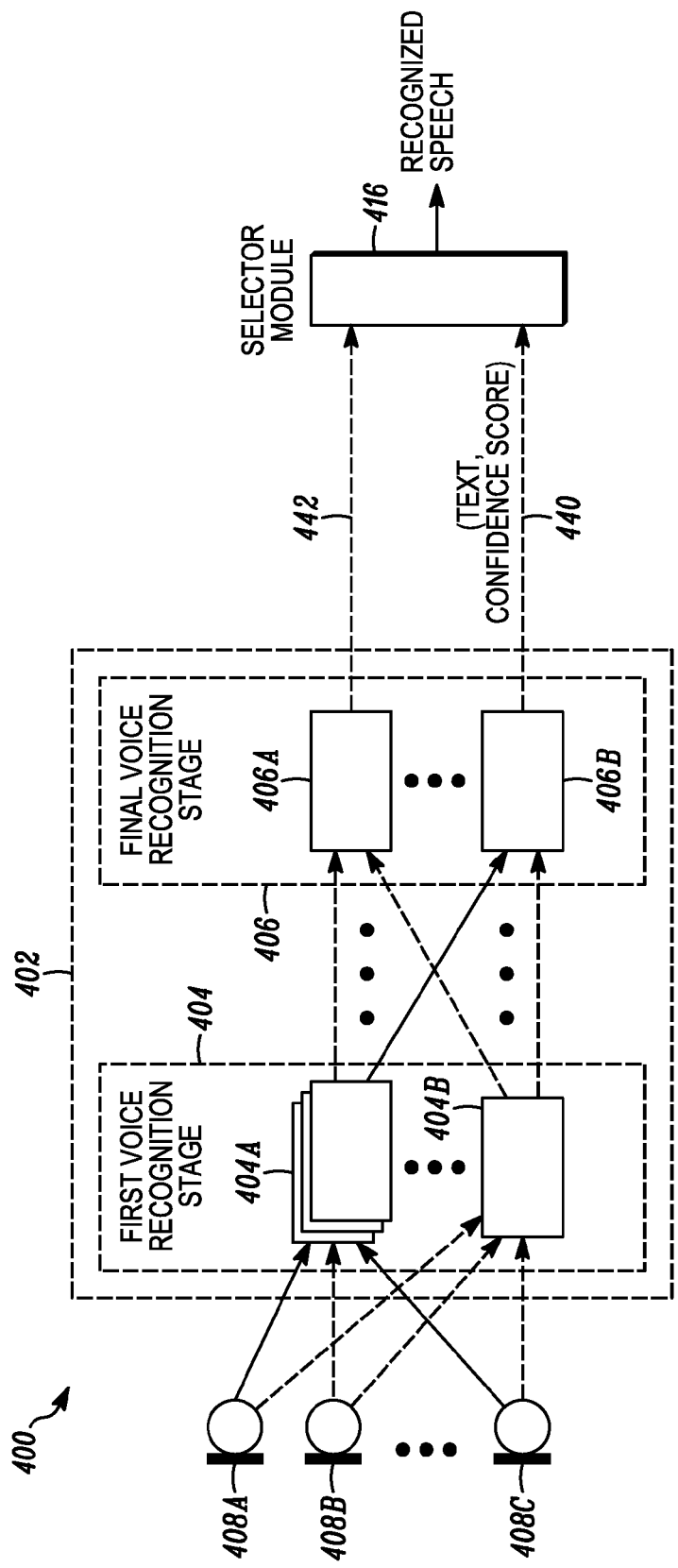
FIG. 4 is one schematic diagram of an example system of parallel processing for voice recognition in accordance with the present teachings.

Turning now to FIG. 4, which shows one embodiment of a system 400 for performing voice recognition. In general, both FIG. 4 and FIG. 5 include components that are configured to implement methods, such as methods illustrated by reference to FIG. 6 and FIG. 7, in accordance with the present teachings as described in detail below. "Adapted," "operative," "capable" or "configured," as used herein, means that the indicated elements, components, or modules are implemented using one or more hardware devices such as one or more operatively coupled processing cores, memory devices, and interfaces, which may or may not be programmed with software and/or firmware as the means for the indicated elements to implement their desired functionality. Such functionality is supported by the other hardware shown in FIG. 2 and FIG. 3.

In an embodiment, the system 400 resides and executes in the pre-processor 304 and performs the function of analyzing an acoustic signal to determine if the signal includes a "trigger" signal. In another embodiment, the system 400 resides and executes in the application processor 306 and performs the function of analyzing an acoustic signal to determine if the acoustic signal includes phrases (that is, speech utterances containing one or more words) related to commands for the mobile device. In other embodiments, the system 400 resides and executes in both the pre-processor 304 and the application processor 306 to analyze acoustic signals for "triggers" and commands.

In one example implementation, at least some modules of the system 400 execute in parallel on the pre-processor 304 and the application processor 306. In still other embodiments, the system 400 executes on a digital signal processor, or other processor of the mobile device 102 where the system 400 performs voice recognition functions. In yet other embodiments, the system 400 resides and executes in both a digital signal processor, and either the pre-processor 304 or the application processor 306.

Figure 5:
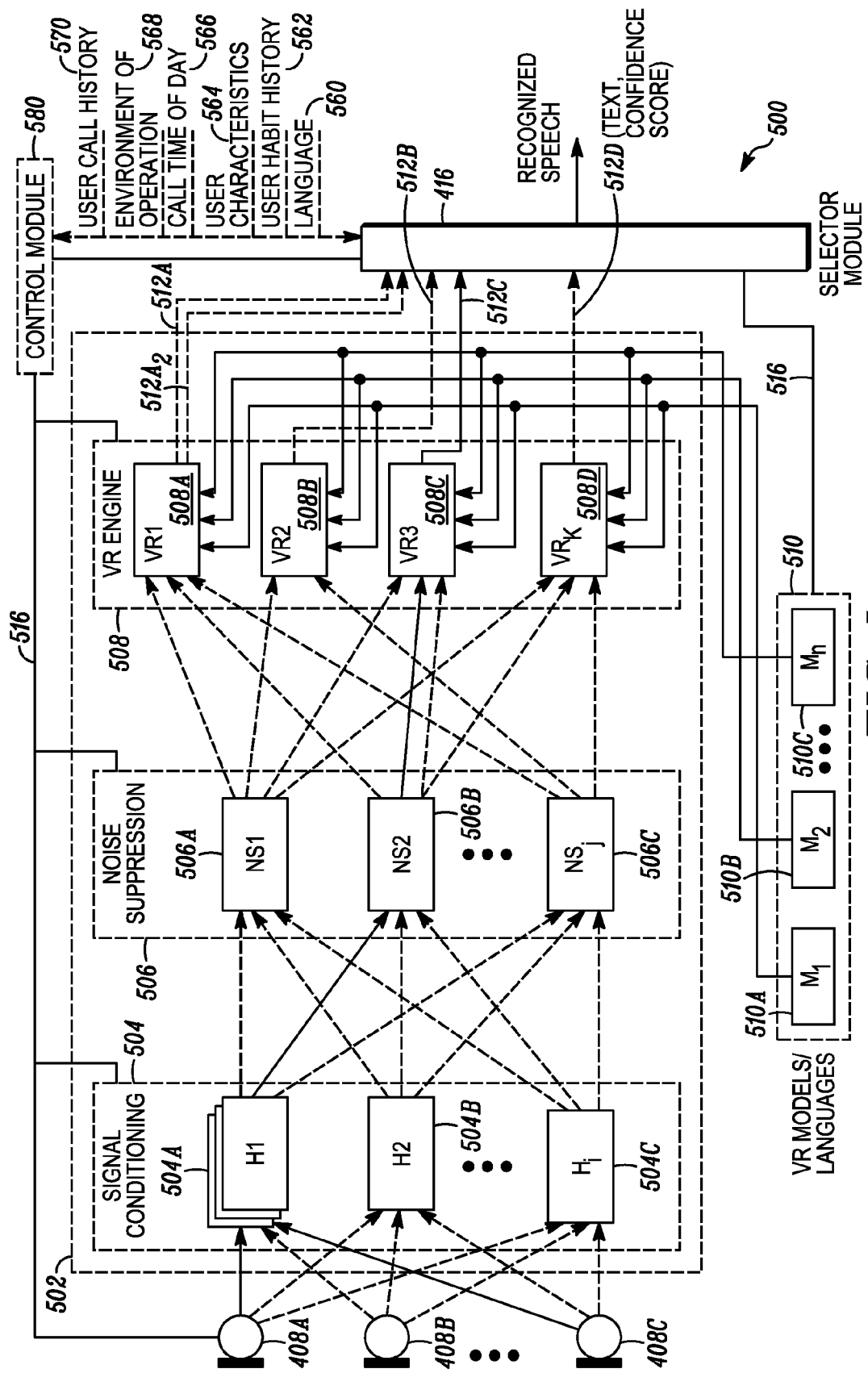
FIG. 5 is another schematic diagram of an example system of parallel processing for voice recognition in accordance with the present teachings.

In the depicted embodiment, the system 400 includes a voice recognition block 402, which includes a plurality of voice recognition stages 404, 406. Although the embodiment depicted in FIG. 4 shows two voice recognition stages 404, 406, in other embodiments (for instance an embodiment shown in FIG. 5), the system 400 includes more than two stages. The system 400 has, in one example embodiment, a plurality of audio or acoustic input devices 408a-c that provide voice inputs into the voice recognition block 402. The acoustic input devices 408a-c are, in one embodiment, microphones, and/or directional microphone beam formers and associated acoustic transducers. Although the depicted embodiment shows three acoustic input devices, in other embodiments the system 400 includes more or fewer than three acoustic input devices. Further, although the embodiments depicted in FIGS. 4 and 5 show the acoustic input devices 408a-c outside the voice recognition block 402 (502), in other embodiments, the acoustic input devices 408a-c comprise a stage of the voice recognition block 402 (502).

Each of the voice recognition stages 404, 406 include at least one voice recognition module 404a 404b, 406a, 406b, and at least two of the voice recognition stages includes multiple modules. Moreover, within a given voice recognition stage, each module performs that same type of process, and at least two of the voice recognition stages perform different processes.

The modules 404a-b, 406a,b, stages 404, 406, and the acoustic input devices 408a operate to aid and/or improve voice recognition processing in a voice recognition system, such as the voice recognition system 300. However, the voice recognition modules 404a 404b, 406a, 406b each implement a given type of voice recognition process. In an embodiment, stages 404 and 406 implement different types of voice recognition processes, for instance signal conditioning, noise suppression, voice recognition engines, etc. Accordingly, although each voice recognition stage and each module within the voice recognition stage is configured to aid or improve some element of voice recognition processing, only a subset or a portion of the voice recognition modules (in this case the voice recognition modules included within the voice recognition engine stage) applies a voice recognition algorithm to actually identify a spoken phrase.

In other embodiments, the voice recognition modules 404a 404b, 406a, 406b are implemented using hardware, firmware or some combination of hardware, firmware, or software. In some embodiments, each voice recognition stage includes more voice recognition modules than those depicted in FIG. 4. Further, in one embodiment, there are multiple instances of one or more of the voice recognition modules 404a-b or 406a-b, wherein the multiple instances of a given voice recognition module are configured to operate in parallel or simultaneously. FIG. 4 illustrates multiple instance of module 404a, which could each receive different combinations of the voice inputs. However, other or all of the modules shown in FIG. 4 could have multiple instances. Thus in some embodiments, the voice recognition block 402 or 502 includes multiple instances of at least one of the modules in at least one of the voice recognition stages.

Accordingly, instead of the voice recognition blocks 402 (and 502 of FIG. 5) being represented as two dimensional blocks as shown, they can be represented as three dimensional blocks. This enables all or selected voice recognition modules in all or selected voice recognition stages to receive different voice inputs, which provides even greater processing flexibility. Moreover, one implementation scenario, the voice recognition modules of a voice recognition stage execute in parallel, that is, the modules execute simultaneously. Thus, in one example, the modules 404a and 404b of the stage 404 execute simultaneously. Likewise, the modules 406a and 406b of the stage 406 execute simultaneously.

The system 400 also includes a selector module 416, which is configured in this embodiment to use various data to select one or more textual outputs from the voice recognition block to approximate a phrase that was received into the acoustic input devices 408a-c. In one embodiment, the selector module 416 uses just confidence scores received from the modules of the final output stage 406 to perform its functionality. In another embodiment, the selector module 416 uses the confidence scores and additional data, called historical data for instance, as described below to perform its functionality.

The selector module 416, in one example, outputs recognized or detected speech. For instance, if the system 400 executes on the pre-processor 304, the recognized speech is used to determine if a user spoken phrase is a trigger phrase. If the system 400 executes on the application processor 306 the recognized speech is used to determine if the spoken phrase is a command. If the system 400 is running on both the pre-processor 304, the application processor 306, and/or some other processor of the mobile device 102, the system 400 performs voice recognition processing to detect trigger phrases, commands and/or other verbal messages communicated from the user 104 to interact with the mobile device 102. Accordingly, the pre-processor 304 may output an audio signal, detected text, or a flag stating that one or more trigger phrases have been detected.

In one embodiment, the acoustic input devices 408a-c are configured to receive speech from a user and communicate the speech to the modules 404a-b comprising the first voice recognition stage 404. In this example, each acoustic input device 408a-c propagates a voice channel to each module 404a,b of the first voice recognition stage 410. In one example, one or more voice recognition modules, for example voice recognition module 404a, is comprised of a plurality of voice recognition modules running in parallel. In such a case, each instance of the particular module receives a different combination of voice inputs from acoustic input devices 404a-c, which is processed in parallel. Further, each instance of voice recognition module 404a produces an output which is propagated to each of the voice recognition modules of the subsequent voice recognition stage 406.

Although FIG. 4 depicts output from voice recognition module 404a as one line, this one line includes, in one example, the output from each instance of the multiple instances of voice recognition module 404a. Similarly, some embodiments of each voice recognition modules of FIG. 4 and FIG. 5 also include multiple instances which produce multiple outputs that are communicated to one or more voice recognition modules of a subsequent voice recognition stage. Herein, a voice channel or voice input is audio information communicated from one or more physical microphones or audio information communicated from one or more virtual microphones that is a combination of multiple microphones.

Thus, in the example depicted in FIG. 4, each module 404a,b of the first voice recognition stage is configured to receive three voice channels from the acoustic input devices 408a-c. In other embodiments, the system 400 includes more than three acoustic input devices, and thus each of the modules 404a,b of the first voice recognition stage 404 is configured to receive more than three inputs. However in general, the modules 404a,b of the first voice recognition stage 404 are configured to receive one or more voice channels (shown as dashed and solid lines extending from the acoustic input devices 408a-c to the voice recognition modules 404a,b) from at least one of the acoustic input devices 408a-c. Each module of the first voice recognition stage 404 can receive all of the voice inputs as shown in FIG. 4, or alternatively each module can receive different voice inputs, which could be all of the voice inputs or a subset of all of the voice inputs.

The modules 404a,b of the first voice recognition stage 404 perform voice recognition processing on the voice channels to generate a first plurality of outputs (shown as dashed and solid lines extending from the modules 404a,b to the modules 406a,b). The first plurality of outputs are passed to a subsequent voice recognition stage, which is configured to process a plurality of the outputs from an immediately preceding voice recognition stage and generate a plurality of corresponding subsequent outputs. This continues until a final voice recognition stage receives a plurality of voice recognition outputs from an immediately preceding voice recognition stage. The final voice recognition stage includes at least one voice recognition module configured to process the plurality of voice recognition outputs from the immediately preceding voice recognition stage, and generate a plurality of final outputs, e.g., 440, 442.

In one embodiment, at least one final output is associated with a path through the voice recognition block 402. A path through the voice recognition block includes processing performed by one of the voice recognition modules from each of the voice recognition stages 404, 406 of the voice recognition block 402. In the example shown, the solid line denotes a path associated with a final output 440 that the selector module 416 selected as the final output approximating a spoken phrase, also referred to herein as a first phrase. In an example embodiment, the plurality of final outputs is generated via a plurality of different paths through the voice recognition block, wherein each path includes processing performed by one of the voice recognition modules from each voice recognition stages of the voice recognition block.

Turning now to FIG. 5, which depicts another embodiment of a system 500 for performing voice recognition. In this embodiment, the system 500 includes a voice recognition block 502, which includes a plurality of voice recognition stages 504, 506, 508, the selector module 416, a control module 580, the plurality of acoustic input devices 408a-c, and a plurality of voice recognition models/languages (VRML) modules 510a-c. Depending on the embodiment, the system 500 resides and executes in the pre-processor 304, the application processor 306 and/or another processor of the mobile device 102, in a substantially similar manner as the system 400 depicted in FIG. 4.

In the system 500 depicted in FIG. 5, each voice recognition stage 504, 506, 508 performs a different type of voice recognition processing. For example, the voice recognition stage 504 performs signal conditioning processing, the voice recognition stage 506 performs noise suppression processing, and the voice recognition stage 508 performs voice recognition engine processing. For any given voice recognition stage, e.g., 504, 506, or 508, the voice recognition modules within that stage may execute in parallel. Moreover, the voice recognition modules within a given stage perform a same type of voice recognition processing, but perform the voice recognition processing in a different manner.

For example, the modules 504a and 504b both perform signal conditioning, but in one example, module 504a performs signal conditioning in a slightly different manner than module 504b. For instance, types of signal conditioning used in different embodiments include different types of equalization, de-reverberation or other desired signal conditioning for improved voice recognition. Thus, the output from modules 504a and 504b can differ even though the outputs are based on the same voice input from acoustic input devices 408a-c. Similarly, the noise suppression modules 506a, 506b, 506c each perform noise suppression processing, but the noise suppression modules 506a, 506b, 506c reduce unwanted noise from an audio signal in different ways.

Further, as described in relation to FIG. 4, in some embodiments, there are multiple instances of one or more voice recognition modules within the voice recognition block 502. Further, as explained in relation to FIG. 4, each output from a voice recognition module includes, in some embodiments, the results of voice recognition processing on multiple inputs from a previous stage. Thus, for example, in one embodiment, the output from voice recognition module 504a to voice recognition module 506a includes voice recognition processing that voice recognition module 504a performed on inputs from acoustic input devices 408a-c. To further illustrate, in one example embodiment, the outputs from voice recognition module 506a to voice recognition module 508a includes voice recognition processing that voice recognition module 506a performed on inputs from voice recognition modules 504a-c, where each output from 504a-c also includes voice recognition processing that modules 504a-c performed on inputs received from acoustic input devices 408a-c. Thus, the voice recognition block 502 processes the first plurality of voice inputs using at least one of a different signal conditioning modules 504a-c that perform the signal conditioning processing, a plurality of different noise suppression modules 506a-c that perform the noise suppression processing, a plurality of different voice recognition engine modules 508a-d that perform the voice recognition engine processing, and/or, in one embodiment, a plurality of different voice recognition language modules 510a-c that perform the voice recognition language processing. The signal conditioning stage 504, in one embodiment, includes the removal of percussive modulation related to the user's gate. Additionally, another method of signal improvement is based on stress to noise level of the acquired voice, such as pitch shifting, frequency correction, rate of speech, equalization filtering to improve signal fidelity of the acoustic input devices 408a-c, and the like. Additionally, Phoneme correction based on noise level and type may be enabled.

The noise suppression stage 506, in one embodiment, includes suppressing noise related to wind noise, road noise, noise related to motion, and percussive noise. The types of percussive noise that we will remove from the audio signal are those due to footfalls, device impacts, and vehicle impacts due to road irregularities (i.e. pot holes). Methods that may be utilized to aid in wind noise reduction are adjusting the wind noise reduction filter based on wind content (such a <100 Hz content), adjusting the filter based on uncorrelated low frequency signals from two acoustic input components (e.g., alternate way to detect wind). Further, in one embodiment, noise suppression is accomplished using spectral subtraction algorithms.

In addition to the above detection methods, the system may also determine noise spectrum and stationarity. Non-stationary motion based noise may include frequency shifting due to direction and speed of motion. In one embodiment, the noise suppression can vary depending on the stationarity of the noise the device is in. In a stationary noise case, a single acoustic input device (microphone) 408 may be used with an appropriate stationary noise reduction algorithm. In a non-stationary noise case, more than one acoustic input device (microphone) 408 may be used with an appropriate multi-microphone noise reduction algorithm or beamforming operation.

The VR engine modules 508a-d each perform voice recognition processing, but each module performs voice recognition processing in a different manner, for example using different voice recognition algorithms. A voice recognition algorithm provides outputs, e.g., 512a-d, text and also, in this case, confidence scores from one or more voice inputs after having been processed by one or more modules in the signal conditioning and/or noise suppression stages or one or more voice inputs coming directly from the acoustic input devices 408a-c. Accordingly, the VR engine stage 508, in one embodiment, performs voice recognition improvement, which may be accomplished via speed and stress related voice recognition databases, wind-based acoustic input components, and algorithm selection. Alternatively based on usage mode, VRML modules 510a-c databases specifically trained under different speed and stress conditions may be utilized, when those speeds or stress conditions are known.

In one embodiment, VRML modules 510a-c provide the voice recognition modules 508a-d of the VR engine voice recognition stage 508 with voice recognition models and languages used in performing voice recognition processing. The models and languages of the VRML modules 510a-c include different voice recognition models trained across different usage conditions and/or languages, dialects and accents (for example, US English, regional dialects within a country/area, UK English, English as second language/Hindi, English as a second language/Mandarin, etc.). Although the VRML modules 510a-c are depicted outside the voice recognition block 502, in other embodiments the VRML modules 510a-c are part of the voice recognition block 502 and perform voice recognition language processing in another embodiment the VRML modules 510a-c are formed as a VRML stage 510, and still in another embodiment the VRML modules 510a-c are incorporated as part of the VR engine modules 508a-d.

The selector module 416, in one embodiment, is configured to receive data, including a language 560 spoken by the user, user habit history 562, characteristics of a user 564 that supplies the first phrase, a call time of day 566, data indicating an environment of operation 568 and/or a user call history 570. This data 560-570, in one embodiment, is used in selecting one or more outputs from the voice recognition block to approximate the first phase. Although this data 560-570 shown as provided from outside the selector module 416, in other embodiments other components within the device 102 or perhaps in the cloud 326 provide these inputs. At least some of the data 560-570 resides, in one embodiment, within the selector module 416 such as within suitable storage modules or components.

In one embodiment, the control module 580 is coupled to each of the voice recognition stage 504, 506, 508 via a control line 516. The control module 580 is configured to send and receive control signals to each of the voice recognition modules of the various voice recognition stages via the control line 516. In one embodiment, the control module 580 is separate from the selector module 416. In another embodiment, the control module 580 is part of the selector module 416. In still another embodiment, the selector module 416 performs control functions and the system 500 does not include a control module.

Figure 6:
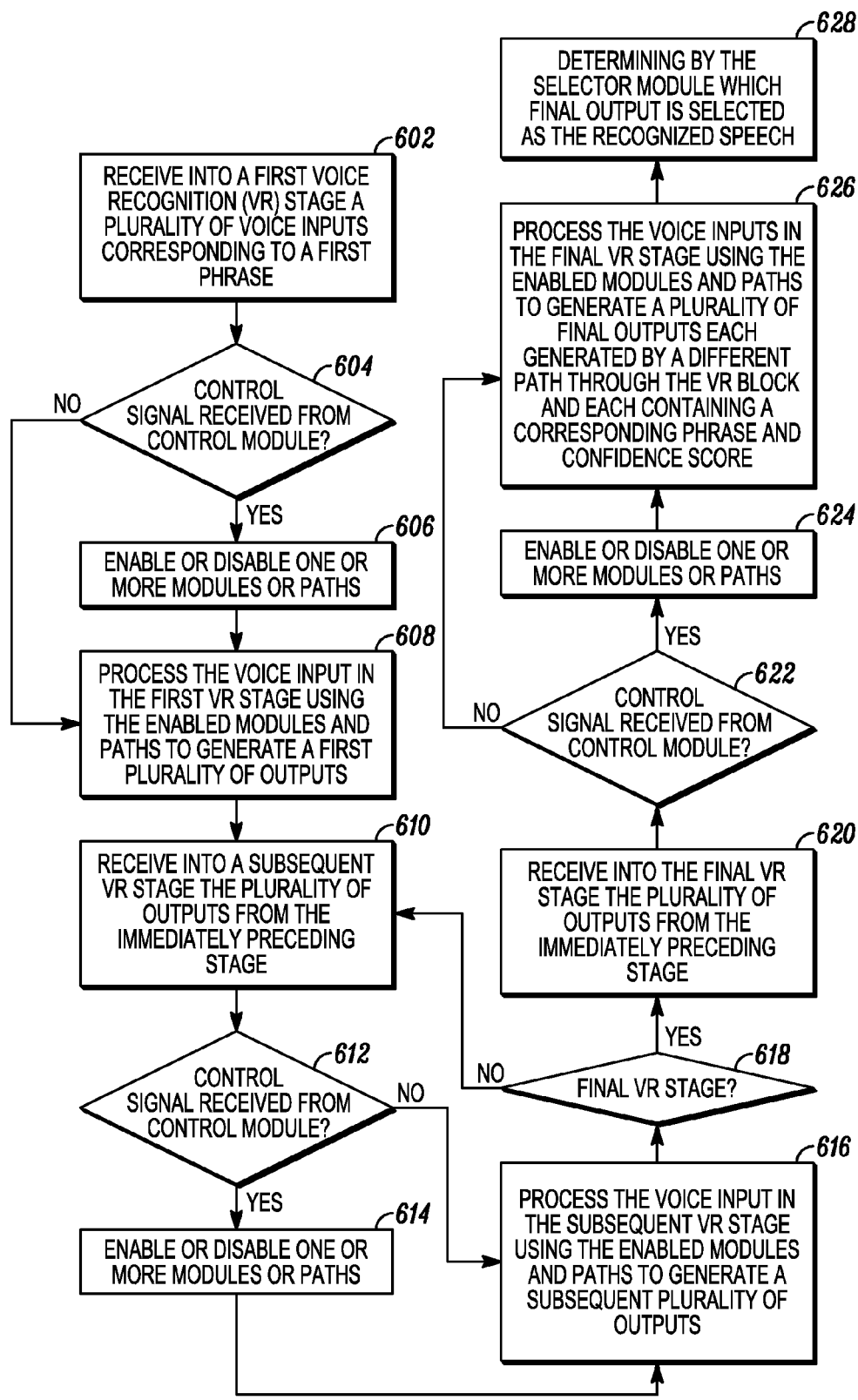
FIG. 6 is a flow diagram showing one embodiment of a method for performing voice recognition in accordance with the present teachings.

Turning now to FIG. 6, which depicts one example method 600 for performing voice recognition in a voice recognition block having a plurality of voice recognition stages, such as voice recognition block 402 of FIG. 4, or voice recognition block 502 of FIG. 5. We will discuss the method 600 as it relates to FIG. 5, but the method 600 is equally applicable to the embodiment depicted in FIG. 4 or other embodiments. The method 600 includes receiving 602 into a first voice recognition stage a plurality of voice inputs corresponding to a first phrase. For example, the acoustic input devices 408a-c communicate a plurality of voice inputs to each of the signal conditioning modules 504a-c of the signal conditioning stage 504, which in this case represents the first voice recognition stage of the voice recognition block 502.

At 604, the first voice recognition stage 504 determines whether it has received input, in this case a control signal, from the control module 580 to enable or disable one or more of its modules or one or more paths through one or more of its modules. In general, this control signal provides information about which of the paths or modules within the stage should be enabled and which should be disabled while processing voice inputs and related voice signals corresponding to a given spoken phrase.

The control line 516, in one embodiment, is coupled to each voice recognition stage 504, 506, 508 and the acoustic inputs 408a-c in order to provide the control signal. In an embodiment, the control line 516 is bi-directional in order for each stage to provide information to allow the control module 580 to determine the paths through the voice recognition block that is traversed by and associated with each final output. Accordingly, control module 580 is in communication with all the voice recognition modules of the voice recognition block 502, as well as the acoustic inputs 408a-c. Therefore, the control module 580 is configured to monitor, enable/disable, and control operations of the voice recognition modules 504a-c, 506a-c, 508a-d comprising the voice recognition block 502.

Further, the control module 580 is configured to monitor, enable/disable and control operations of the acoustic inputs 408a-c in accordance with the quality of signal that the acoustic inputs 408a-c provide. The differing inputs of the acoustic inputs 408a-c, in some embodiments, are due to different virtual beam patterns, microphone 408a-c location, microphone 408a-c direction, and/or different polar patterns of the acoustic inputs 408a-c. In one example, the control module selects a subset of the microphones 408a-c (inputs) when determining the path that was traversed to arrive at the final output 512a-d. In other words, in one embodiment, the control module 580 selects a plurality of inputs from a larger set of inputs to generate the plurality of final outputs. The control module 580 also communicates with the selector module 416. Therefore, when the selector module 416 receives the at least one final output 512a-d, the selector module 416 is configured to determine the path that was traversed through the voice recognition block 502 to arrive at the final output 512a-d.

Because, in one embodiment, the multiple modules 504a-c, 506a-c, 508a-d of each stage 504, 506, 508 are performing respective voice recognition processing in a different manner, each final output 512a-d reflects a different result of a different use-case. In other words, each final output 512a-d reflects performing different types of voice recognition processing in a different manner on different inputs. Thus, when the multiple modules 504a-c, 506a-c,

508*a-d*, and in some cases multiple instances of one or more modules, of the multiple voice recognition stages 504, 506, 508 execute in parallel, a greater coverage of potential usage conditions and variables is achieved when compared to executing through a single process or a single thread of processes.

Based on criteria discussed below, in some embodiments, the control module 580 communicates an input control signal to the voice recognition stage 504, 506, and/or 508 requesting that one or more of its paths or modules be enabled or disabled for path convergence as explained in more detail below by reference to FIG. 7. As the connecting lines in FIG. 5 show, multiple instances of each module may be executed in parallel with different inputs) to each module as is depicted by the multiple connecting lines entering each module. In other words, in some embodiments there are a plurality of H1 modules, a plurality of H2 modules, a plurality of NS1 modules, a plurality of NS2 modules, etc., for each module of each stage. Further, multiple paths through the voice recognition block may produce the same result, as the result of different processing methodologies, which would play into the selection of that result as the final output as the recognized speech by the selector module 416.

Accordingly, in one embodiment, the control module 580 converges on one or more paths by adaptively adjusting, e.g., by limiting or increasing, the number of parallel voice processing modules or paths through the modules executing in one or more voice recognition stages based on "historical" information or data, such as, historical confidence levels across use-cases and users, as well as user re-tries. In some embodiments, adaptively adjusting the number of parallel voice processing modules results in more efficient execution of voice recognition processing, reduced computational load, and minimization of processing delays. As used herein, "historical" data is any data or information that the control module 580 can or does use in adaptively adjusting the number of paths through selected modules of the voice recognition block or by adjusting the number of voice recognition modules applied within one or more of the voice recognition stages.

The control module 580 can, thereby, start by using all of the paths through all of the modules or and then reduce the number of paths based on the historical data. Conversely, the control module 580 could start with a subset of the paths and increase or decrease the number of paths based on the historical data. In additional, the control module can in some instances adjust the paths through one or more modules or adjust the modules without using historical data. For example, where certain microphones or beamforming patterns are used, certain paths or modules with the signal conditioning 504 and/or noise suppression 506 stages may not be needed. Thus, in one embodiment the control module 580 selects a subset (either an increased or a decreased number) of a plurality of different paths through the voice recognition block 502 based at least in part on historical data determined while processing at least one plurality of inputs. Herein a set is defined as including one or more of an item of a certain type and a subset is defines as less than all of the certain type.

Adaptively adjusting the number of voice recognition modules, and/or corresponding paths through the voice recognition block, includes enabling or disabling one or more voice recognition modules or paths through the modules of the voice recognition block 502. The voice recognition modules are adaptively adjusted based on, for example, success rates of different VR engine modules 508*a-c*, mapped to different noise suppression modules 506*a-c*, mapped to different signal conditioning modules 504*a-c*, and the output of different acoustic input devices 408*a-c*.

In other words, the control module 580, in one example embodiment, disables paths from future voice recognition processing if the final output 512*a-d* indicates that the confidence scores generated from the paths are lower than a known threshold level, which is programmed into the device for instance. Similarly, the control module 580, in one example embodiment, enables paths for future voice recognition processing if the final output 512*a-d* indicates that the confidence scores generated from the paths are higher than the threshold level In still another embodiment, the control module 580 is configured to adaptively limit and/or select one or more acoustic input devices 408*a-c* that are used in future voice recognition processing. The voice inputs from acoustic input devices 408*a-c* that provide better final outputs, due to, for example, beam forming differences between the various acoustic input devices, are included in future voice recognition processing. Similarly, the voice inputs from acoustic input devices that lead to poorer final outputs are excluded from future voice recognition processing.

In one example scenario, the selector module 416 determines that final output 512*b* has a low confidence score relative to the other confidence scores associated with final outputs 512*a,c,d*. The final output path 512*b*, in one example scenario, is associated with the path including voice recognition modules 504*b*, 506*c*, and 508*b*. The selector module 416 communicates this information to the control module 580 and a historical database so that this information is available if needed during future acquired utterances.

Accordingly, in one example, the control module 580 disables the path through voice recognition modules 504*b*, 506*c*, and 508*b* from future voice recognition processing performed on phrases that the system 500 processes. In another embodiment, each stage starts with a single path and as voice recognition processing is performed, paths are added to the voice recognition stages to increase the number of final outputs. When disabling modules, however, the control module 580 disables all instances of any individual voice recognition module 504*b*, 506*c*, and 508*b* from future voice recognition processing performed on phrases that the system 500 processes. In this manner, the control module 580 adaptively controls the number of modules executing in parallel.

Returning again to the method 600, upon receiving 604 a control signal from the control module 580, the first voice recognition stage 504 correspondingly enable or disables 606 one or more voice recognition paths or modules. The first voice recognition stage 504 then processes 608 the received voice inputs using the enabled modules and paths. Where no control signal is received 604 by the first voice recognition stage, the first voice recognition stage 504 processes 608 the received voice inputs using all of the modules and associated paths through the modules, as in a first processing pass through the voice recognition block 502 without the benefit of historical data, or using the enabled modules and paths from the last or immediately preceding processing pass through the voice recognition block 502.

The plurality of outputs from the immediately preceding stage is received 610 into a subsequent voice recognition stage. In one example, the signal conditioning stage 504 generates the first plurality of outputs, which are received into the noise suppression stage 506. At 612, the subsequent voice recognition stage, that is, the noise suppression stage 506, determines whether it has received a control signal from the control module 580 indicating that one or more modules or paths should be enabled or disabled.

If so, the noise suppression stage 506 correspondingly enable or disables 614 one or more of its modules or paths and processes 616 the voice inputs using the enabled modules and paths to generate a subsequent plurality of outputs. In our example scenario, if all paths through the noise suppression modules 506a and 506b are enabled, then these paths are used to process the voice inputs to generate a subsequent plurality of outputs. Where the noise suppression stage 506 received no control signal at 612, processing 616 of the voice inputs proceeds without adjusting the paths or modules therein.

If the subsequent voice recognition stage is not the final voice recognition stage, the plurality of outputs are received 610 into another subsequent voice recognition stage. If, on the other hand, the subsequent voice recognition stage is the final voice recognition stage, the plurality of outputs from the immediately preceding stage are received 620 into the final voice recognition stage. For example, the plurality of outputs from the noise suppression voice recognition stage 506 are received into VR engine stage 508.

At 622, the final voice recognition stage determines whether it has received a control signal from the control module 580 indicating that one or more modules or paths should be enabled or disabled, and correspondingly enables or disables 624 the one or more paths or modules. The voice inputs are processed in the final voice recognition stage 508 using the enabled path and modules to generate the plurality of final outputs 512a-d each generated 626 by a different path through the voice recognition block 502 and each containing a corresponding phrase and confidence score. Where the VR engine stage 506 received no control signal at 622, processing 626 of the voice inputs proceeds without adjusting the paths or modules therein.

At 628, the selector module 416 determines which final output is selected as the recognized speech. Since the selector module 416 receives both text results and confidence scores from the final voice recognition stage, the selector module 416 can use the received text results and/or the confidence scores to select a final output. This determination can be made by picking the final output with the highest confidence score. Alternatively, the final outputs can be categorized and weighted before making the final decision. Additionally, the selector module 416 may make multiple decisions on the same voiced utterance either serially or in parallel. In one embodiment, in accordance with the selector module's 416 selection, the control module 580 would chose one path through the voice recognition processing block 502 to determine that a trigger has been spoken, a second path to determine that a local command has been uttered after the trigger, and yet a third path that could be used for network voice recognition for network based commands or searches. In this embodiment different audio inputs, signal conditioning, noise suppression and VR engines can be selected for each of the three outputs for the highest degree of accuracy even though they operated on the same speech utterance from the user of the device.

As mentioned earlier, multiple paths through the voice recognition block may produce a final output having a same text, as the result of different processing methodologies, this is one weighting factor used by the selector module 416 in determining which final output is selected as the recognized speech. As weighted measure of a number of paths that resulted in the same result, an average confidence score and variation in confidence score can be used to determine the ultimate output of the system.

Accordingly, by using the method 600, functionality is provided in some embodiments that includes determining an adjusted set of voice recognition processing paths associated with at least one of the final outputs 512a-d selected as approximating the first phrase through the voice recognition block by selecting paths comprising processing using at least one of an adjusted number of paths through one or more of the plurality of different signal conditioning modules 504a-c an adjusted number of paths through one or more of the plurality of different noise suppression modules 506a-c, an adjusted number of paths through one or more of the plurality of different voice recognition engine modules 508a-d, and in one embodiment, an adjusted number of paths through one or more of the plurality of different voice recognition language modules 510a-c. Where the paths for a particular module are adjusted down to zero, that module is effectively disabled. Therefore, upon receiving into the first voice recognition stage 504 a second plurality of voice inputs corresponding to a second phrase, the second plurality of voice inputs is processed in the voice recognition block 502 using the adjusted set of voice recognition processing paths.

Figure 7:
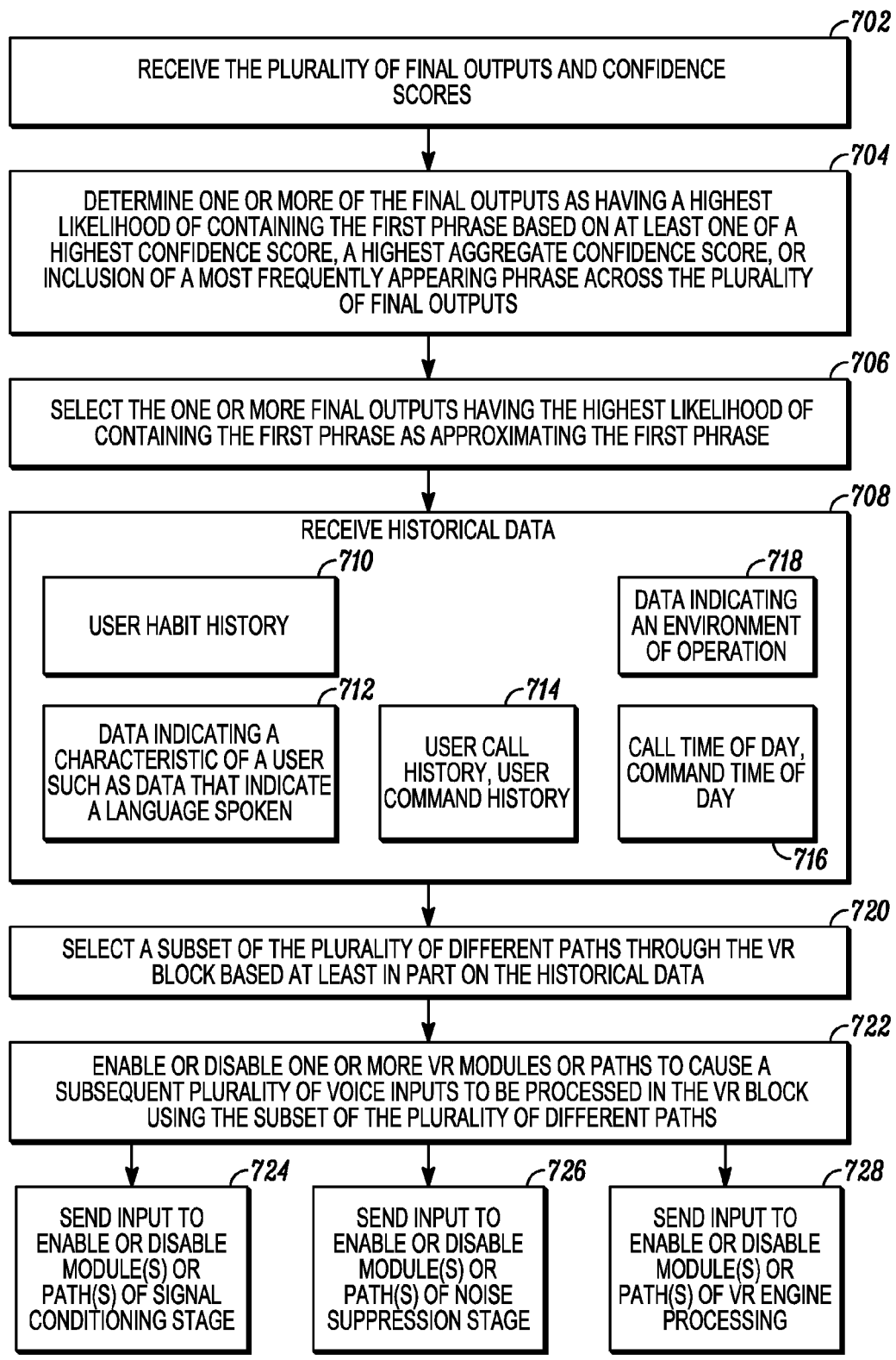
FIG. 7 is a flow diagram showing another embodiment of a method for performing voice recognition in accordance with the present teachings.

Turning now to FIG. 7, which depicts another embodiment of a method for performing voice recognition. As previously described, the final outputs, such as, final outputs 512a-d include text and a confidence score. In particular, the final outputs 512a-d include one or more tuples of text and confidence scores. Thus, in one example, the final output 512a includes the tuples, [("Miles", 85%), ("Giles", 50%), . . . ]. Similarly, the other final outputs 512b-d, in some embodiments, include tuples of text and a confidence score. At 702, the selector module 416 receives the final outputs and confidence scores and selects, for instance as described below, at least one of the final outputs as approximating a first phrase, which corresponds to a plurality of voice inputs received, for instance, from the acoustic input devices 408a-c into the signal conditioning stage 504.

For example, the at least one selected final output has a highest likelihood of containing the first phrase, which corresponds to the plurality of voice inputs. In another embodiment, the final output with the highest likelihood of containing the first phrase is determined based on a highest confidence score calculated for the at least one selected final output. In yet another embodiment, the highest likelihood is determined based on a highest aggregate confidence score calculated for the at least one selected final output. In still another embodiment, the highest likelihood is determined based on the at least one selected final output containing a most frequently appearing phrase across the plurality of final outputs. In a further embodiment, the final output is a combination of these metrics.

In particular, at 704, the selector module 416 determines one or more of the final outputs as having a highest likelihood of containing the first phrase based on at least one of a highest confidence score, a highest aggregate confidence score, or inclusion of a most frequently appearing phrase across the plurality of final outputs. In one example, the selector module 416 selects one or more final outputs 512a-d as the output with the highest likelihood of containing the first phrase if the final output has the highest, or is tied for the highest confidence score of all the final outputs 512a-d. A highest confidence score, in one example, is determined when the confidence score associated with the text of a final output is greater than the confidence score associated with the text of any other final output.

A highest aggregate confidence score, in one example, is determined when textual output of a first set of final outputs is "Mia" with an associated aggregate confidence score of 90%, and textual output of a second set of final outputs is "Tia" with an associated aggregate confidence score of 50%. The selector module 416 selects the first set of final outputs with the higher confidence score of 90% as the final output having the phrase that most closely approximates the spoken phrase. In one example, inclusion of a most frequently occurring phrase occurs if the textual output "June" appears in three of the final outputs, and the textual output "Moon" appears in two of the final outputs, the selector module 416 selects the final output "June" as the output with the highest likelihood of containing the first phrase.

The selector module 416, at 706, selects the one or more final outputs having the highest likelihood of containing the first phrase as approximating the first phrase. The selector module 416 outputs the selected output, in one example, as recognized speech. As previously described, in one example embodiment, the selector module 416 receives historical data 708 from a source external to the selector module 416. In one embodiment the historical data comprises data indicating a name uttered by a user, a user call history, user command history, a user trigger, a user command or a call time of day. In some examples, the historical data further, data indicating a name uttered by a user, a user call history, user command history, a user trigger, a user command, a call time of day, and/or data indicating an environment of operation 718.

An example of user call history 714 includes determining whether the first phrase is "Mary" or "Larry" where the user call history indicates that the user has called "Mary" ten times, but never called a person named "Larry", then the selector module 416 selects "Mary" as the output with the highest likelihood of containing the first phrase. An example of command history includes determining whether the first phrase is "search" or "lurch." If the command history indicates that the user has issued a "search" command numerous times, but never issued the "lurch" command, then, in one embodiment, the selector module 416 selects the phrase "search" as the output with the highest likelihood of containing the first phrase.

One example of user habit history 710, includes determining whether the first phrase was "Frank" or "Hank" based on if the user 102 typically calls "Frank" after calling home. If the user has just dialed home and the selector module 416 cannot determine if the first phrase is "call Hank" or "call Frank," the selector module 416, in one embodiment, chooses "call Frank" if the user 104 just previously dialed home. Another example of user habit history 710 includes determining whether the first phrase was "Frank" or "Hank" based on if the user 104 typically calls "Hank" from the office but never calls "Frank" from the office. If the device 102 determines that the user 104 is in the office and the selector module 416 cannot determine if the first phrase is "call Hank" or "call Frank," the selector module 416, in one embodiment, chooses "call Hank."

In another embodiment, the historical data indicates an environment within which the device 102 containing the voice recognition block 502 is operating. The environment includes, in one example, the mobile device being in a car dock, or in a car with the radio on, etc. If the mobile device 102 determines that the environment is noisy or filled with echoes, voice recognition modules or paths of the voice recognition block 502 which do not operate well in noisy or echo filled environments are disabled.

The historical data, in one example, includes data 712 indicating a language that the user 104 speaks. Thus, the control module 580 tailors the VR models and languages 510*a-c* of the VR engines modules 508*a-d* such that the VR engine modules 508*a-d* are representative of the language the user 104 speaks. One example of call time of day 716 includes determining whether the first phrase is "Gina" or "Tina" because the user habit history indicates that the user calls "Gina" between the hours of 9 AM and 5 PM but only calls "Tina" after 5 PM, and the time of the call is 10 AM. Therefore, the selector module 416 selects "Gina" as the output with the highest likelihood of containing the first phrase.

At 720, the control module 580 is configured to select a subset of a plurality of different paths based on historical data comprising data indicating at least one of a characteristic of the user, whether a trigger has been spoken, whether a local command is uttered after the trigger, whether a network based command or search is required, an environment in which a device containing the voice recognition block is operating, a user call history, or a call time of day. The control module 580 enables or disables 722 one or more voice recognition modules or paths to cause a subsequent plurality of voice inputs to be processed in the voice recognition block using the subset of the plurality of different paths. Further, in one embodiment, the selector module 416 selects the final output 512*a-d* associated with the subset of plurality of different paths serially or in parallel.

To enable or disable the one or more voice recognition paths, the control module 580 sends input to enable or disable at least one of module or path of the signal conditioning stage 724, the noise suppression stage 726, and/or the VR engine processing 728. In another embodiment, selecting a subset of different paths through the voice recognition block 502 includes increasing or decreasing the number of voice recognition modules used in the voice recognition block 502, and accordingly increasing or decreasing the number of paths, used in subsequent voice recognition processing. In still another embodiment, the selector module 416 is configured to select a first path associated with text of one or more final outputs 512*a-d* that corresponds to a trigger, and the selector module 416 is configured to selected a second path for the trigger.

In the foregoing specification, specific embodiments have been described. However, one of ordinary skill in the art appreciates that various modifications and changes can be made without departing from the scope of the teachings as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The embodiments are defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A computer-implemented method comprising:
defining, in an automated speech recognizer in which audio data is processed by a signal conditioning stage followed by a noise suppression stage followed by a language modeling stage, the signal conditioning stage including quantity i processing alternatives, the noise suppression stage including quantity j processing alternatives, and the language modeling stage including quantity k processing alternatives, quantity (i*j*k) alternative paths for processing the audio data through the multiple stages of the automated speech recognizer, i, j, and k being greater than one;
generating, for each of the quantity (i*j*k) alternative paths, a transcription of particular audio data based on processing the particular audio data through each of the stages of the automated speech recognizer according to the alternative path; and
selecting a particular transcription from among the respective transcriptions that are generated for the quantity (i*j*k) alternative paths; and
providing the particular transcription for output.

2. The method of claim 1, wherein each of the quantity (i*j*k) alternative paths of a respective stage are executed at least partially in parallel.

3. The method of claim 1, comprising:
generating, for each of the transcriptions, a confidence score,
wherein selecting the particular transcription is based on the confidence scores.

4. The method of claim 1, wherein selecting the particular transcription is based on additional data that includes user call history, user command history, time of day, or an operating environment of a device that receives the particular audio data.

5. The method of claim 1, wherein each of the quantity (i*j*k) alternative paths is configured to receive audio data from a different audio channel.

6. A system comprising:
one or more computers and one or more storage devices storing instructions that are operable, when executed by the one or more computers, to cause the one or more computers to perform operations comprising:
defining, in an automated speech recognizer in which audio data is processed by a signal conditioning stage followed by a noise suppression stage followed by a language modeling stage, the signal conditioning stage including quantity i processing alternatives, the noise suppression stage including quantity j processing alternatives, and the language modeling stage including quantity k processing alternatives, quantity (i*j*k) alternative paths for processing the audio data through the multiple stages of the automated speech recognizer, i, j, and k being greater than one;
generating, for each of the quantity (i*j*k) alternative paths, a transcription of particular audio data based on processing the particular audio data through each of the stages of the automated speech recognizer according to the alternative path; and
selecting a particular transcription from among the respective transcriptions that are generated for the quantity (i*j*k) alternative paths signal conditioning stage; and
providing the particular transcription for output.

7. The system of claim 6, wherein each of the quantity (i*j*k) alternative paths of a respective stage are executed at least partially in parallel.

8. The system of claim 6, wherein the operations further comprise:
generating, for each of the transcriptions, a confidence score,
wherein selecting the particular transcription is based on the confidence scores.

9. The system of claim 6, wherein selecting the particular transcription is based on additional data that includes user call history, user command history, time of day, or an operating environment of a device that receives the particular audio data.

10. The system of claim 6, wherein each of the quantity (i*j*k) alternative paths is configured to receive audio data from a different audio channel.

11. A non-transitory computer-readable medium storing software comprising instructions executable by one or more computers which, upon such execution, cause the one or more computers to perform operations comprising:
defining, in an automated speech recognizer in which audio data is processed by a signal conditioning stage followed by a noise suppression stage followed by a language modeling stage, the signal conditioning stage including quantity i processing alternatives, the noise suppression stage including quantity j processing alternatives, and the language modeling stage including quantity k processing alternatives, quantity (i*j*k) alternative paths for processing the audio data through the multiple stages of the automated speech recognizer, i, j, and k being greater than one;
generating, for each of the quantity (i*j*k) alternative paths, a transcription of particular audio data based on processing the particular audio data through each of the stages of the automated speech recognizer according to the alternative path; and
selecting a particular transcription from among the respective transcriptions that are generated for the quantity (i*j*k) alternative paths; and
providing the particular transcription for output.

12. The medium of claim 11, wherein each of the quantity (i*j*k) alternative paths of a respective stage are executed at least partially in parallel.

13. The medium of claim 11, wherein the operations further comprise:
generating, for each of the transcriptions, a confidence score,
wherein selecting the particular transcription is based on the confidence scores.

14. The medium of claim 11, wherein selecting the particular transcription is based on additional data that includes user call history, user command history, time of day, or an operating environment of a device that receives the particular audio data.

15. The medium of claim 11, wherein each of the quantity (i*j*k) alternative paths is configured to receive audio data from a different audio channel.

* * * * *